United States Patent
Konno et al.

[11] 4,416,605
[45] Nov. 22, 1983

[54] SCREEN/DIVERTER CHANGING MECHANISM FOR EXTRUDERS

[75] Inventors: Masashi Konno, Akashi; Osamu Ikeda, Kobe, both of Japan

[73] Assignee: Kabushiki Kaisha Kobe Seiko Sho, Kobe, Japan

[21] Appl. No.: 374,751

[22] Filed: May 4, 1982

[30] Foreign Application Priority Data

May 7, 1981 [JP] Japan .................... 56-66511[U]

[51] Int. Cl.³ .................................... B29F 3/06
[52] U.S. Cl. .................................... 425/185; 210/236; 210/DIG. 15; 264/39; 264/169; 425/186; 425/197; 425/198; 425/199; 425/382 R
[58] Field of Search ............... 425/198, 197, 199, 183, 425/185, 186, 382 R; 264/169, 39; 210/791, 236, DIG. 15

[56] References Cited

U.S. PATENT DOCUMENTS

| | | | |
|---|---|---|---|
| 3,501,806 | 3/1970 | Schrader | 425/185 |
| 3,589,163 | 6/1971 | Byrne et al. | 425/185 |
| 3,804,758 | 4/1974 | Cooper et al. | 210/236 |
| 3,856,277 | 12/1974 | Tiramani | 425/185 |
| 3,900,399 | 8/1975 | Kreyenborg et al. | 425/185 |
| 3,940,222 | 2/1976 | Zink | 425/199 |
| 4,025,434 | 5/1977 | Mladota | 210/236 |
| 4,167,384 | 9/1979 | Shirato et al | 425/183 |
| 4,202,659 | 5/1980 | Kinoshita | 425/183 |
| 4,257,901 | 3/1981 | Rapp | 425/197 |
| 4,318,677 | 3/1982 | Ullrich et al. | 425/183 |

FOREIGN PATENT DOCUMENTS

| | | | |
|---|---|---|---|
| 45-2477 | 1/1970 | Japan | 425/197 |
| 55-132230 | 10/1980 | Japan | 425/197 |
| 504945 | 5/1971 | Switzerland | 425/183 |

*Primary Examiner*—Jeffery R. Thurlow
*Attorney, Agent, or Firm*—Oblon, Fisher, Spivak, McClelland & Maier

[57] ABSTRACT

In an extruder of the type including an extruding cylinder with an outlet at one end thereof and an extruding screw rotatably disposed in the cylinder and circumferentially formed with a feed flight member for forwarding a plasticized material through the outlet of said cylinder for extrusion through a screen located at the fore end of the extruding cylinder, a screen/diverter changing mechanism including a retainer box fixed to the fore outlet end of the extruding cylinder and internally defining a flow passage of the plasticized material to be extruded; a slide body movable transversely in a guide bore of the retainer box across the flow passage thereof; a screen unit detachably fitted in the slide body and having a screen and a plurality of nozzles; a diverter unit detachably fitted in the slide body and having a diverting flow passage for diverting the flow of the plasticized material from the cylinder; a drive mechanism linked to the slide body for selectively positioning either the screen unit or diverter unit in the flow passage of the retainer box; and a die plate fixedly mounted on the front side of the retainer box and having a plurality of nozzles for extruding the plasticized material fed from the cylinder through the screen unit.

5 Claims, 2 Drawing Figures

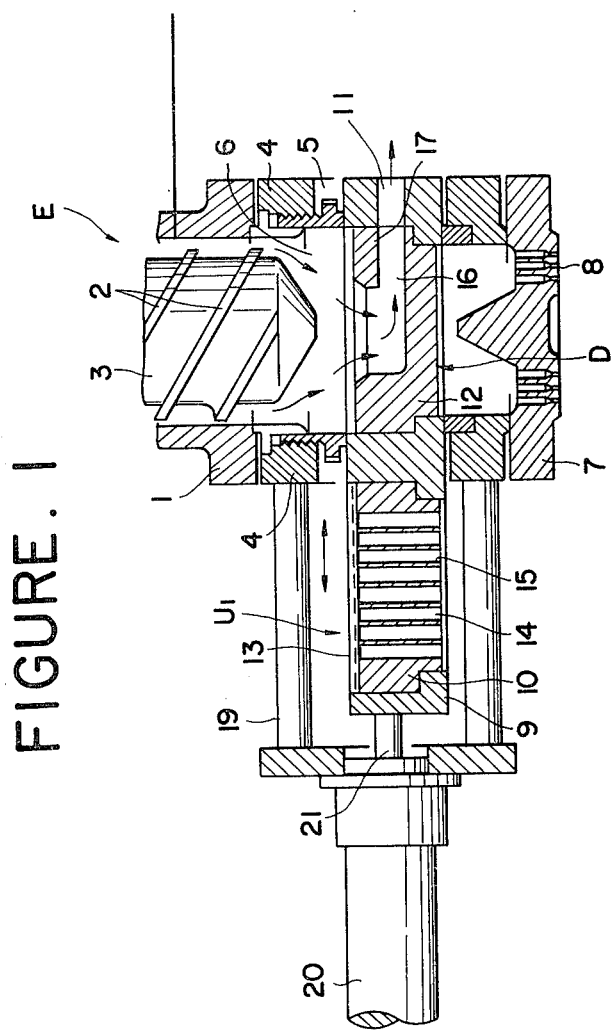

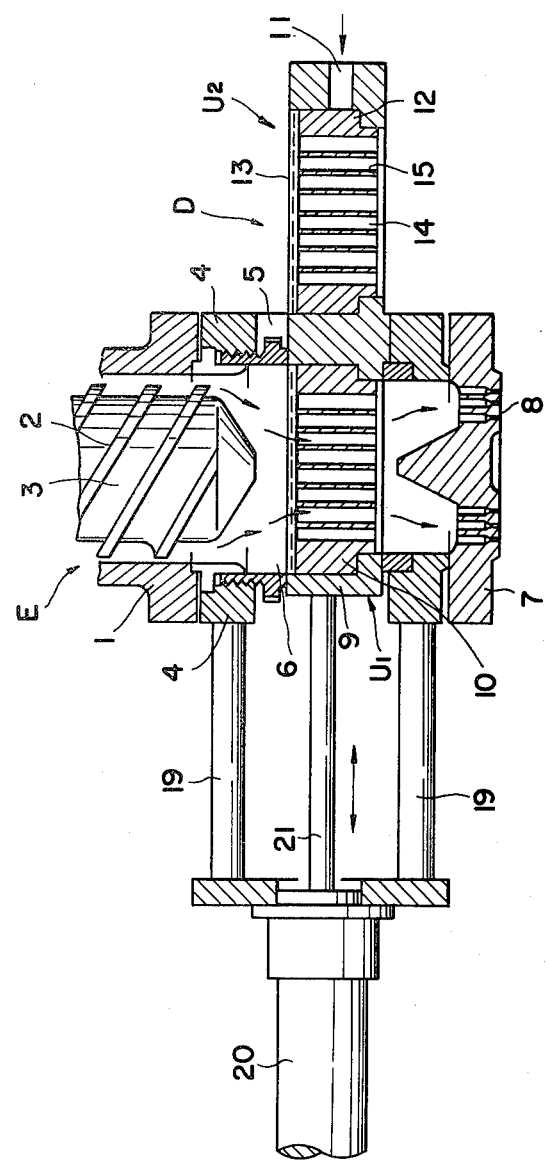

SCREEN/DIVERTER CHANGING MECHANISM FOR EXTRUDERS

BACKGROUND OF THE INVENTION (1) Field of the Invention

This invention relates to improvements in and relating to a screen replacing mechanism for extruders.

(2) Description of the Prior Art

In some cases, an extruder is used in combination with a pelletizer which is located at the top end of the extruder for the purpose of pelletizing a thermoplastic synthetic resin or the like.

With regard to the pelletizing operation, there have thus far been proposed various types of pelletizers, of which the most typical is the underwater pelletizer which is accepted in many cases for its high pelletizing efficiency.

The construction of the underwater pelletizer is well known in the art so that particulars of its construction are omitted herein. When starting a pelletizing operation by the use of such a pelletizer, it is the general practice to actuate the extruder in advance to send forward a plasticized resin material by an extruding screw in a cylinder through a passage (nozzle) in a die plate at the fore end of the cylinder confirming whether or not the resin material is extruded at a uniform or nonuniform speed from the passage in the die plate. At this time, the resin passages in the cylinder and die plate are filled with the plasticized resin material. After the preparatory operation, the extruder is once stopped to clean off the plasticized resin which has deposited on the surface of the die plate and restarted to commence the pelletizing operation. During the temporary stop of the extruder, the extruding material flows out of the die plate nozzle and deposits on the cleaned surfaces of the die plate under the influence of the residual pressure which lingers in the extruder due to the viscosity of the plasticized material and the fluidity of the extruding material which is heated and plasticized by the extruder for extrusion.

If the extruder is restarted to initiate the pelletizing operation with the deposition of the resin material on the surfaces of the die plate, difficulty is encountered in cutting the extrudate by a rotating cutter knife of the pelletizer, the deposit of a plasticized resin on the die plate sticking on the cutter knife without undergoing its cutting action which is necessary for the pelletizing. Further, when restarting the extruder, it has been necessary to increase the rotational speed of the extruding screw with appropriate timing for elevating the speed of extrusion through the die plate, and at the same time supplying cooling water to a water chamber of the pelletizer also with appropriate timing. Such operation requires a high level technique and meticulous skill. Nevertheless, even if an operator has succeeded in performing these operations, it has been extremely difficult to keep the operation constantly at a stable state.

Although the foregoing description has been directed to a underwater pelletizer, it is necessary in almost all types of extruders including the underwater pelletizer to remove residual extruding material from the cylinder in advance by actuating the extruder after removing the extruding head or a screen assembly at the fore end of the cylinder at the time of cleaning the extruding cylinder or changing the extruding material or its color.

SUMMARY OF THE INVENTION

With the foregoing in view, the present invention has as its object the provision of a screen/diverter replacing mechanism with detachable screen and diverter units to facilitate their replacement and switching of operation to and from extruding and cleaning or diverting operations.

According to the present invention, there is provided a screen/diverter replacing mechanism for an extruder having an extruding cylinder with an outlet at one end thereof and an extruding screw rotatably disposed in the cylinder and circumferentially formed with a feed flight member for forwarding a plasticized material through the outlet of the cylinder for extrusion through a screen located at the fore end of the extruding cylinder, a screen/diverter changing mechanism comprising: a retainer box fixed to the fore end of the extruding cylinder and internally defining a flow passage for the plasticized material to be extruded; a slide body movable transversely in the retainer box across the flow passage thereof; a screen unit detachably fitted in the slide body and having a screen and a breaker plate; a diverter unit detachably fitted in the slide body and having a diverting flow passage for diverting the flow of the plasticized material from the extruding cylinder; a drive mechanism linked to the slide body for selectively positioning either the screen unit or diverter unit in the flow passage of the retainer box; and a die plate fixedly mounted on the front side of the retainer box and having a number of nozzles for extruding the plasticized material fed from the cylinder through the screen unit.

The above and other objects, features and advantages of the present invention will become apparent from the following description and appended claims, taken in conjunction with the accompanying drawing which shows by way of example a preferred embodiment of the invention.

BRIEF DESCRIPTION OF THE DRAWING

In the accompanying drawings:

FIGS. 1 and 2 are diagrammatic vertical sections of a screen/diverter changing mechanism according to the present invention.

DETAILED DESCRIPTION OF THE PREFERRED EMBODIMENT

Referring to FIGS. 1 and 2, there is shown a screen replacing mechanism according to the present invention, of which FIG. 1 shows the filter net assembly in a diverting operation using a diverter unit for discharging extruding material from the extruder and FIG. 2 shows the screen replacing mechanism in position for ordinary extruding operation.

In FIG. 1, indicated at E is an extruder which has an extruding screw 3 with a feed flight 2 disposed within a cylinder 1. A retainer box 4 is attached to the fore end of the cylinder 1 by mechanical fixing means (e.g., bolts), the retainer box 4 being provided with a guide bore 5 perpendicularly to the flow path 6 of an extruding material for receiving a filter net mechanism which will be described hereinlater.

Reference numeral 7 designates a die plate which is fixed on the front side of the retainer box 4 by mechanical fixing means (e.g., bolts) and provided with a multitude of extruding nozzles 8 at suitable intervals.

A slide body 9 which is slidably fitted in the guide bore 5 of the retainer box 4 is formed with a first retaining stepped bore 10 and a second retaining stepped bore 12 which is in communication with a diverting port 11 such that the first and second retaining stepped bores 10 and 12 are communicated with each other in the extruding direction of the extruder E. Fitted detachably in the first retaining stepped bore 10 is a screen unit $U_1$ with an organically assembled screen 13 and breaker plate 15 which is provided with a multitude of nozzles 14 extending side-by-side in the flow direction of the extruding material. Fitted detachably in the second retainer stepped bore 12 is a diverter unit D having a diverter plate 17 with a diverting passage 16 communicating at one end with the diverting port 11 at one end of the slide body 9 and at the other end with the flow passage 6 defined by the retainer box 4.

Reference numeral 19 denotes a drive support frame which is provided at one side of the retainer box 4 for supporting a drive mechanism 20 such as a hydraulic piston-cylinder or the like. The piston rod 21 of the drive mechanism 20 is connected to the opposing side of the slide body 9 to move the latter reciprocally in the directions indicated by arrows.

The filter net assembly according to the present invention is used and operated in the following manner. Referring to FIG. 1 which shows the preparatory stage of the extruding operation with the diverter unit D positioned in the flow passage 6 of the extruding material as mentioned hereinbefore, the extruding material which is forwarded by the screw 3 is discharged through the diverting passage 16 and the diverting port 11 in the slide body 9 of screen replacing mechanism, blocking the passage of the plasticized material through the nozzles 8 in the die plate.

In this manner, the diversion of the extruding material is continued for a certain time period in the preparatory stage of the extruding operation to discharge completely the residual material in the extruder, namely, the material which remained in the extruder before starting the same. After this, the drive mechanism 20 is actuated to shift the position of the slide body 9 in the arrowed direction to position the screen unit $U_1$ in the flow passage 6 in the retainer box 4, fixing the slide body 9 in that position by stopping the drive mechanism 20.

After switching the screen unit $U_1$ to the extruding position, the material which is forwarded by the screw 3 of the extruder E is fed through the screen 13 and breaker plate 15 of the screen unit $U_1$ and extruded through the nozzles 8 in the front die plate 7. The extruded material is supplied to the pelletizer and cut into suitable lengths for pelletizing by the pelletizer (not shown).

The foregoing operation is continued so as to extrude the charged material continuously, while the diverter unit D which is positioned outside the extruder can be removed and replaced by a spare screen unit $U_2$ (see FIG. 2) which can promptly take over from the screen unit $U_1$ in use should clogging or other problems occur with the latter.

The screen unit $U_1$ can be replaced by the spare screen unit $U_2$ which is fitted in the retaining stepped bore 12. Therefore, the position of the filter net assembly is simply switched by actuating the drive mechanism 20.

Thus, the screen unit $U_2$ which has been replaced due to clogging or for other reason is positioned outside the extruder E so that it can be replaced by another spare screen unit or by the diverter unit D which has been once removed from the retaining stepped bore 12 of the slide body 9, in preparation for the next diverting operation prior to a fresh start of the extruding operation.

As is clear from the foregoing description, the present invention provides a screen replacing mechanism suitable for use in an extruder of the type which has an extruding cylinder with an outlet at one end, an extruding screw rotatably fitted in the extruding cylinder and circumferentially formed with a feed flight member for forwarding a plasticized material through the outlet, and a screen assembly and a die plate attached to the fore end of the extruding cylinder, extruding the plasticized material through nozzles in the die plate via a screen assembly. According to the present invention, the filter net assembly essentially comprises a slidable body fitted in a retainer box at the fore end of the extruding cylinder of the extruder and connected to a drive mechanism like a hydraulic piston-cylinder for transverse sliding movement within the retainer box, a screen unit detachably fitted in the slidable body and having a screen and a multitude of extruding nozzles, and a diverter unit detachably fitted in the slidable body and formed with a diverting passage for discharging residual extruding material in the extruder. The slidable body of the screen replacing mechanism is moved by the drive mechanism to selectively position the screen unit or the diverter unit in the flow passage of plasticized extruding material in the retainer box to extrude or divert the plasticized material sent forward by the screw without passing through the die plate. Further, in a case where the extruder is used in combination with a pelletizer or the like, if the diverting unit D is positioned in the flow passage 6 of the extruder after filling the respective nozzles 8 of the die plate 7 with the plasticized resin, it becomes possible to prevent the resin from flowing and depositing on the die plate 7 under the influence of the residual pressure of the extruder acting on the die plate 7, thus eliminating the aforementioned problem of cutting failures.

In addition, the extruding operation can be started without any special technique or meticulous skill of the operator by rotation of the extruding screw 3 at a predetermined speed prior to initiation of the cutting operation, while diverting the plasticized resin material through the diverting passage 16, and switching the position from the diverting unit D to the filter unit $U_1$ by an electric signal in synchronism with the supply of cooling water to the water chamber.

The shift of the slide body 9 for a switch to a normal extruding operation can also be completed quickly in a facilitated manner, coupled with the advantage that the filter and diverter units which are detachably fitted in the slide body of the changing mechanism can be replaced extremely easily when they need replacement due to a damage or for other reasons.

Of course, the extruder which incorporates the screen replacing mechanism according to the present invention can be used in combination with various machines other than the pelletizer. The present invention can be applied to existing screen or filter replacing devices simply by change of some component parts.

What is claimed is:

1. A screen/diverter changing mechanism for an extruder of the type including an extruding cylinder with an outlet at the downstream end thereof and an extruding screw rotatably disposed in said cylinder and circumferentially formed with a feed flight member for forwarding a plasticized material through the outlet of the cylinder for extrusion through a screen located at the downstream end of the extruding cylinder, said screen/diverter changing mechanism comprising:

(a) a retainer box fixed to the downstream end of the extruding cylinder, said retainer box internally defining a longitudinal flow passage for plasticized material and a transverse guide bore which is in communication with said longitudinal flow passage;

(b) a die plate fixed to the downstream end of said retainer box, said die plate being provided with a plurality of extruding nozzles in communication with said longitudinal flow passage;

(c) a slide body slidably received in said transverse guide bore, said slide body internally defining a transverse diverting port;

(d) a screen unit detachably fitted in said slide body, said screen unit internally defining a longitudinal flow passage for plasticized material, said screen unit being provided with a screen mounted in said longitudinal flow passage and, downstream of said screen, a plurality of extruding nozzles;

(e) a diverter unit detachably fitted in said slide body, said diverter unit internally defining a bent flow passage for diverting the flow of plasticized material from the extruder cylinder, the downstream end of said bent flow passage being in communication with said transverse diverting port in said slide body; and (f) a drive mechanism linked to said slide body for selectively positioning either the upstream end of said longitudinal flow passage in said screen unit or the upstream end of said bent flow passage in said diverter unit in communication with said longitudinal flow passage in said retainer box;

(g) said retainer box and said slide body being sized and shaped so that, when said longitudinal flow passage in said screen unit is in communication with said longitudinal flow passage in said retainer box, the portion of said slide body containing said diverter unit projects outwardly of said retainer box, permitting removal of said diverter unit and its replacement with a second screen unit.

2. A screen/diverter changing mechanism as recited in claim 1 wherein said screen unit is detachably fitted in a stepped bore in said slide body.

3. A screen/diverter changing mechanism as recited in claim 2 wherein said diverter unit is detachably fitted in a stepped bore in said slide body.

4. A screen/diverter changing mechanism as recited in claim 1 wherein said diverter unit is detachably fitted in a stepped bore in said slide body.

5. A screen/diverter changing mechanism as recited in claim 1 wherein said drive mechanism comprises a hydraulic piston-cylinder and a piston rod one end of which is connected to the piston in said hydraulic piston-cylinder and the other end of which is connected to said slide body.

* * * * *